Aug. 5, 1958 — R. P. SHEA — 2,846,635
AUTOMATIC LEVELING CONTROL
Filed June 8, 1954 — 2 Sheets-Sheet 1

REEFORD P. SHEA
INVENTOR

Herbert E. Kidder
AGENT

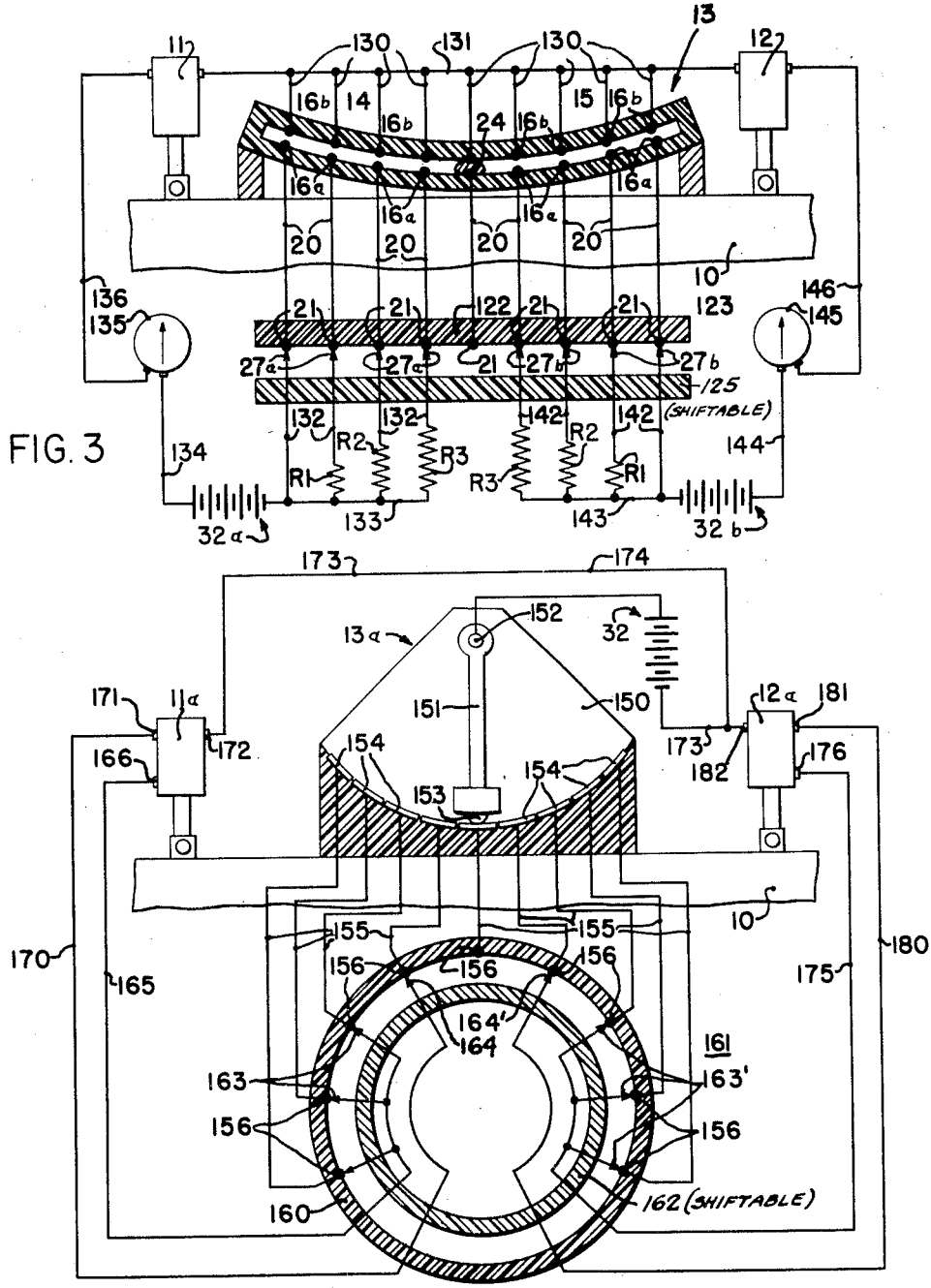

United States Patent Office 2,846,635
Patented Aug. 5, 1958

2,846,635
AUTOMATIC LEVELING CONTROL

Reeford P. Shea, Riverside, Calif., assignor to Preco Incorporated, Los Angeles, Calif., a corporation of California Application June 8, 1954, Serial No. 435,116

15 Claims. (Cl. 318—489)

The present invention relates to improvements in automatic leveling controls and clinometers, and is particularly adapted for use in road graders or material spreading equipment, altho not limited to such application. The purpose of the invention is to provide improved means for maintaining a scraper blade or other movable member in a horizontal position or at a predetermined angle of inclination, independent of the position of the supporting frame, and the primary object of the invention is to provide an electrical control which can be adjusted from a remote station, such as the driver's cab, to position the movable member at any desired angle of inclination. Once the electrical control has been adjusted, the mechanism of the invention functions to maintain the said movable member at the selected angle of inclination, automatically correcting for any tilting of the machine as the latter travels over uneven ground.

Another important object of the invention is to provide an automatic leveling mechanism embodying a control unit having provision for adjusting the null point, at which point the operating mechanism comes to rest. This adjustable null point is used in conjunction with a tilt-responsive unit of the type comprising an arcuate ball race or mercury tube or the like, having a plurality of spaced contacts provided therein which are engaged by a contact medium in the form of a metal ball or globule of mercury or other conductive fluid. These contacts are connected into a circuit in a manner whereby engagement of the contact by the ball or globule of mercury causes electrical current to flow in the system, thereby operating a reversible motor means to tilt the blade or movable member in one direction or the other until the said blade is brought back to the predetermined angular position. The null point in the system is formed, in one embodiment of the invention, by two adjacent contacts of like polarity in the tilt-responsive unit, and the primary feature of the invention is the provision of means for changing the polarity of the contacts, so that any desired pair of adjacent contacts along the length of the tube can be made of like polarity to establish the null point at that position.

A further object of the invention is to provide an automatic leveling mechanism embodying means for returning the movable member to its predetermined angle of inclination at a rapid rate of recovery when the said member is tilted to a considerable angle, changing to a slower rate of recovery as the said member approaches its predetermined angle. This slowing down of the return movement as the movable member approaches its preset position eliminates any tendency of the mechanism to overshoot the mark by its own inertia, yet at the same time, permits extremely rapid recovery of the member when suddenly tilted sharply as the machine lurches over uneven ground. In one form of the invention, this slowing down of the recovery mechanism is accomplished by means of stepped resistances in the circuit, which regulate the speed of the motors driving the recovery mechanism. In another form of the invention, the recovery mechanism is operated by two-speed motors, and the circuit is so arranged that the current transmitted by the tilt-responsive unit is supplied to the high speed motor terminals when the movable member is tilted to a considerable angle from its preset position, and is then switched to the low speed terminals of the motors as the said member approaches its preset position.

Another object of the invention is to provide an automatic leveling device of the class described embodying means for giving a remote indication of the angle to which the movable member is tilted from its preset position. This advantageous feature permits the operator to observe the exact position of the scraper blade or other movable member from his station in the driver's cab.

Still another object of the invention is to provide a simple, inexpensive, foolproof leveling control that is, at the same time, extremely accurate and instantaneously responsive.

The foregoing and other objects and advantages of the invention will become apparent to those skilled in the art upon consideration of the following detailed description of some illustrative embodiments thereof, reference being had to the accompanying drawings, wherein:

Figure 3 is a schematic view of another form of the invention embodying a variable speed recovery mechanism; and Figure 4 is a schematic view of still another form of the invention embodying a two-speed recovery system.

Figure 1:
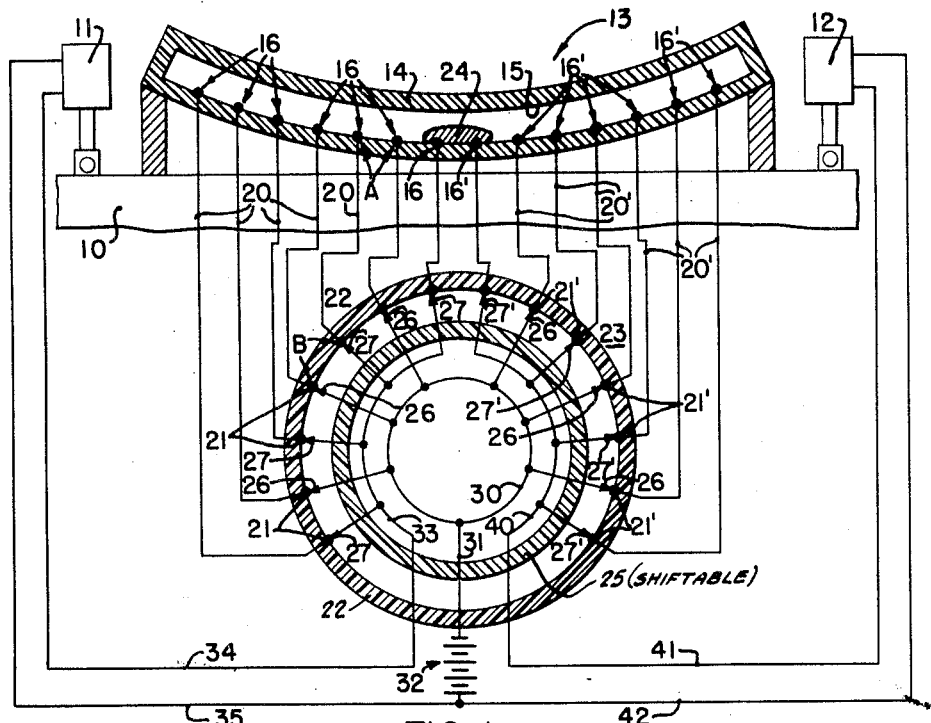
Figure 1 is a schematic drawing of a system embodying the principles of the invention.

Referring first to Figure 1, the invention is illustratively shown as embodied in a road grader, wherein the scraper blade or mold board is designated by the reference numeral 10. The blade 10 extends generally transverse to the direction of forward travel of the machine, and is conventionally mounted on the grader frame for tilting movement about a fore and aft extending axis. Reversible motor means is connected to the blade 10 in a manner to control the angle of inclination of the blade, the said motor means being illustratively shown as two oppositely driven motor units 11 and 12, connected to oppositive ends of the blade. In actual practice, there are usually two reversible motors located at opposite ends of the blade, which work in opposition to one another, and it will be obvious that the present invention could be used with two such reversible motors by suitably connecting them into the circuit.

The motors 11 and 12 may be in the form of reversible electric motors driving a screw jack or the like, or they may take the form of hydraulic cylinders operated by solenoid-actuated or motor-driven valves. In the former instance, the screw acts to lock the blade in adjusted position when the motors are idle; and in the latter instance the hydraulic cylinders perform similar locking action when the control valves are closed. Mouted on the blade 10 and movable therewith is a tilt-responsive unit 13 comprising an arcuately curved tube 14 of non-conductive material such as glass or plastic, having a central bore or passageway 15 provided therein. The curvature of the tube 14 is preferably circular and of the order of 36" radius, altho it is not necessarily circular and may be of any desired radius. For example, the curvature of the tube might be parabolic, or elliptical, or any other mathematical or empirical curve giving operational characteristics especially suited to the type of work with which the unit is to be used.

Disposed within the bore of the tube and embedded in the bottom surface thereof are contacts 16 and 16', which are equidistantly spaced along the length of the tube. The contacts 16, 16' are connected by wires 20, 20' to corresponding contacts 21 and 21' on a stationary circular member 22, which forms part of a switch unit 23. The contacts 21, 21' are equidistantly spaced around a portion of the circumference of the member 22, and contacts 21 are arranged on the left-hand side of the member 22, while contacts 21' are on the right-hand side thereof. In like manner, contacts 16 are all disposed on the left-hand side of the tube 14, while contacts 16' are disposed on the right-hand side thereof.

Contained within the tube 14 is a contact medium in the form of a globule of mercury or other conductive liquid 24, which is of sufficient size to bridge two adjacent contacts in the tube and forms an electrical connection therebetween. Instead of a globule of mercury, a metal ball might be used as the contact medium, in which case the pairs of contacts would be arranged side by side along the length of a ball race, instead of spaced apart longitudinally of the tube. The globule of mercury seeks the lowest level in the tube, and when the unit 13 is tilted with the blade 10, the mercury moves towards one end or the other of the tube.

The switch unit 23 also includes a rotary circular member 25, having a plurality of equidistantly spaced switching contacts 26, 27, and 27' provided thereon, which register with the contacts 21, 21' on member 22. Contacts 27 are arranged on the left-hand side of the member 25, while contacts 27' are on the right-hand side thereof. With the exception of the two center contacts 27, 27', the remaining contacts 27, 27' alternate with contacts 26.

All of the contacts 26 are connected to a common loop 30, which is connected by a wire 31 to one side of a battery 32, or other source of electrical energy. Contacts 27 on the left-hand side of the member 25 are connected to a common wire 33, which is joined by a wire 34 to motor 11 on the left-hand end of the blade. The return wire 35 from motor 11 is connected to the other side of the battery 32. Contacts 27' on the right-hand side of the member 25 are connected to a common wire 40, which is joined by a wire 41 to motor 12 on the right-hand end of the blade. The return wire 42 from motor 12 is likewise connected to the other side of the battery 32.

By virtue of the arrangement described, every other contact 16 on the left-hand side of the tube 14 is connected to motor 11, which operates to tilt the blade 10 in one direction; while every other contact 16' on the right-hand side of the tube is connected to the motor 12, which operates to tilt the blade in the other direction. The in-between contacts 16 and 16' are connected to one side of the battery 32, and therefore are of opposite polarity to the contacts 16, 16', which are connected to the motors 11 and 12, inasmuch as the motors are connected to the other side of the battery. The sole exception to the alternate arrangement of opposite polarity contacts along the length of the tube 14 is the two center contacts 16, 16', which are of like polarity owing to the fact that the two center contacts 27, 27' of member 25 are connected to the motors 11, 12, and thence to the same side of the battery 32.

Thus, when the switch 23 is centered, as shown in Figure 1, the two center contacts 16, 16' of the tube 14 are of like polarity, and consequently pass no current when bridged by the mercury globule 24. In other words, there is an open circuit in the system, owing to the fact that the two center contacts 16, 16' are connected by lines 34, 35 and 41, 42 to one side of the battery 32, but there is no connection to the other side of the battery. At this point, the system is "dead," and the two center contacts are the null point of the system.

If the unit 13 is tilted to the left by the blade 10, the mercury globule 24 moves to the left and bridges another pair of contacts 16. Now, two contacts of unlike polarity are electrically connected by the mercury, and current flows from the battery 32 thru lines 31 and 30 to the contacts 26 and 21, which are connected by one of the lines 20 to one of the two contacts 16 immersed in the mercury. The other contact 16 bridged by the mercury carries current to its line 20 and thence to the associated contacts 21 and 27. The circuit is completed by lines 33 and 34 to the motor 11, and back via line 35 to the other side of the battery. The motor 11 is thus energized to raise the left-hand end of the blade 10 until the mercury globule 24 returns to its centered null position.

If the unit 13 is tilted to the right by the blade 10, the mercury globule 24 moves to the right and bridges another pair of contacts 16' of opposite polarity. Current now flows from the battery 32 thru lines 31 and 30 to the contacts 26 and 21', which are connected by one of the lines 20' to one of the two contacts 16' immersed in the mercury. The other contact 16' bridged by the mercury carries current to its line 20' and thence to the associated contacts 21' and 27'. The circuit is completed by lines 40 and 41 to motor 12, and back via line 42 to the other side of the battery. The motor 12 is thus energized to raise the right-hand end of the blade 10 while the left-hand end is lowered, until the mercury globule 24 returns to its centered null position.

When the blade 10 is to be adjusted to some angular position other than horizontal, the rotatable switch member 25 is turned to one side or the other, to shift the two center contacts 27, 27' over to another pair of stationary contacts 21 or 21', which has the effect of moving the null point of the tube 14 to one side or the other of center. To expedite this null point adjustment, the movable switch member 25 has graduations provided thereon (not shown) which are marked in angular increments for the corresponding angular positions of the blade 10 obtained at each of the null point adjustments available on the switch.

Thus, for example, if it is desired to tilt the blade to the left to the angle whereat the globule of mercury comes to rest on the two contacts 16 designated by the reference character A, the switch member 25 is turned counter-clockwise to engage the two center contacts 27, 27' with the two contacts 21 designated at B. With the switch in this position, the null point is now shifted to the two contacts A, and the two center contacts 16, 16' of the tube 14 are now of opposite polarity. Current is transmitted thru the mercury and along the lines 20, 20', 40, and 41 to motor 12, which raises the right-hand end of the blade 10, while the left-hand end thereof is lowered. As the blade tilts to the left, the mercury 24 moves to the left, successively bridging other pairs of contacts 16 which now convey current to motor 12, until the mercury bridges contacts A. At this point, the current flow ceases, and the blade 10 stops at the predetermined angle of inclination. Any tilting of the blade from this adjusted position due to traveling over uneven ground causes the mercury 24 to move to one side or the other of the new null point, thereby actuating the corresponding motor 11, 12, to restore the blade to its adjusted angular position.

It will be understood by those skilled in the art that the current from the battery 32 and switch 23 could be fed into an amplifier, if desired, to power the motors 11, 12, instead of driving the motors direct. This would have the advantage of reducing the current passing thru the contacts, and would reduce any arcing tendency. The use of such an amplifier is believed too obvious to require more detailed discussion herein.

It will also be understood that in this embodiment and in the ones that follow, the single-direction, oppositely driven motors 11, 12 would, in actual practice, be replaced by two reversible motors working in opposition, so that the left-hand end of the blade 10 is raised while the right-hand end thereof is lowered, and vice versa.

Figure 2:
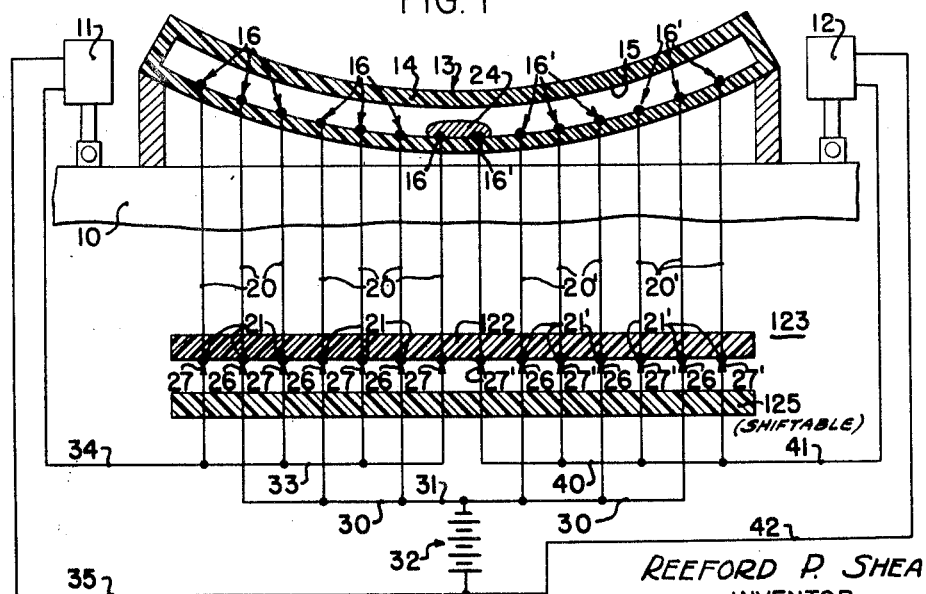
Figure 2 is a similar view of another embodiment of the invention.

The second embodiment of my invention, shown in Figure 2, is generally similar to the arrangement just described, except for the construction of the switch. Accordingly, the tilt responsive unit 13 and all other parts that are identical in construction to the embodiment of Figure 1, are given the same reference numerals as in the latter and will not be described again.

The switch unit is designated in its entirety by the reference numeral 123, and comprises two parallel rectilinear members 122 and 125. Switch member 122 is stationary, and has contacts 21 and 21' mounted thereon. Switch member 125 is slidably supported for linear movement parallel to member 123, and contacts 26, 27 and 26', 27' are mounted thereon.

As in the preceding embodiment, the two center contacts 16, 16' of the tube 14 are of the same polarity when the movable switch member 125 is centered with respect to the stationary member 122, as in Figure 2, and all of the other contacts 16, 16' are alternately of opposite polarity. As long as the mercury globule 24 bridges the two contacts of like polarity, the system is inactive. Whenever the mercury is shifted to one side of the null point, however, the circuit to one or the other of motors 11, 12 is closed, and the blade 10 is thereby restored to its original position.

The angle of inclination of the blade 10 is changed by shifting the movable switch member to a designated position on the appropriate side, which has the effect of shifting the null point of the unit 13 in the same manner as described in connection with Figure 1.

The embodiment shown in Figure 3 is generally similar to the arrangement shown in Figure 2, and elements similar to those previously described have been given the same reference numerals.

Distinguishing Figure 3 from Figure 2, is a somewhat different arrangement of the contacts in the mercury tube 14. It will be noted that the pairs of cooperating contacts 16a and 16b are located directly opposite one another in the bore 15 of the tube. Contacts 16a are embedded in the bottom side of the bore, while contacts 16b are embedded in the top side of the bore. The globule of mercury 24 is of sufficient size to contact both the top and bottom of the bore 15, and thus bridges the two contacts 16a, 16b of each pair. The top contacts 16b are connected by wires 130 to a line 131, which is connected to one terminal of both of the motors 11 and 12.

The bottom contacts 16a of the mercury tube are connected by wires 20 to contacts 21 of the stationary member 122 of the switch 123. Contacts 27a and 27b on the movable member 125 of the switch, engage contacts 21 on the stationary member. Contacts 27a are arranged on the left-hand side of the member 125, while contacts 27b are arranged on the right-hand side thereof. The two groups of contacts 27a and 27b are separated from one another by a gap, so that one of the contacts 21 on member 122 is not engaged by a corresponding contact on member 125.

Contacts 27a are connected by wires 132 and 133 to one side of battery 32a. Connected into the wires 132 are resistances $R_1$, $R_2$, and $R_3$, which are of increasing resistance values; the highest resistance being $R_3$, which is adjacent the center of the member 125, and the lowest resistance being $R_1$, which is adjacent the end wire. The extreme left-hand end wire 132 has no resistance element connected thereto.

The other side of the battery 32a is connected by a wire 134 to one terminal of an ammeter 135; the other terminal of which is connected by a wire 136 to the other terminal of motor 11.

Contacts 27b are connected by wires 142 and 143 to one side of battery 32b. Connected into the wires 142 are resistances $R_1$, $R_2$, and $R_3$, which are of the same resistance values as resistances $R_1$, $R_2$, and $R_3$ in wire 132. The extreme right-hand end wire 142 has no resistance element connected thereto.

The other side of battery 32b is connected by a wire 144 to one terminal of an ammeter 145; the other terminal of which is connected by a wire 146 to the other terminal of motor 12.

In the operation of this embodiment, the center pair of contacts 16a and 16b in the tilt-responsive unit 13 are the null point contacts, owing to the fact that the center contact 21 of the stationary switch member 122 is not engaged by a contact on the movable switch member 125. Thus, the circuit is open when the null point contacts 16a, 16b are bridged by the mercury globule. If the mercury moves to either side of the null point, however, current is transmitted to the corresponding motor 11 or 12 to tilt the member 10 back to its original position.

If the member 10 is tilted to a considerable angle from its present position, the mercury globule 24 moves to the contacts at one end of the tube 14. Since there is no resistance in the end line 132 or 142, the maximum amount of current is transmitted to the motor 11 or 12, causing the same to operate at maximum speed to return the movable member 10 to its original position as rapidly as possible. As the member 10 tilts back to its original postion, the mercury globule moves back toward the mid-point of the tube 14, successively bridging pairs of contacts 16a, 16b which are connected to resistances $R_1$, $R_2$, and $R_3$. These increasing resistances reduce the amount of current transmitted to the motors 11 or 12, and thereby reduce the speed thereof so that the speed of recovery of the movable member 10 slows down as the member approaches its preset position. As the member 10 comes to the exact preset position, the mercury globule 24 bridges the open null point contacts 16a, 16b and the motor stops. The member 10 is adjustable to any desired angle of inclination by shifting the movable switch member 125 to the proper indicated position, which has the effect of shifting the null point of the tilt-responsive member to the position occupied by the mercury globule when the member is at the desired angle.

The ammeters 135 and 145 are located at the operator's station in the driver's cab, and they indicate the amount of current being transmitted to the motors 11, 12. Since the current varies with each pair of contacts 16a, 16b, owing to the resistances $R_1$, $R_2$, and $R_3$, the meter face may be graduated in angles of inclination of the movable member corresponding to the position of the member when the globule of mercury bridges each successive pair of contacts in tube 14. The operator is thus able to see at all times the position of the movable member 10. Instead of using two motors 11, 12 and two meters 135, 145, it will be understood that a single reversible motor and a single meter might be used instead. In this case, the meter would deflect to one side of a zero point when the motor is operating in one direction and to the other side of zero when the motor is operating in the reverse direction.

The embodiment shown in Figure 4 uses a different form of tilt-responsive unit and rotary switch from those described earlier, altho the principles of operation are the same. The tilt-responsive unit, designated at 13a, comprises a body 150 which is mounted on the movable member 10. A pendulum 151 is suspended from a pivot 152 on the body, and has a contact 153 which wipes on a contact 154. The contacts 154 are arranged in a circular arc concentric with the pivot 152, and are connected by wires 155 to contacts 156 on the stationary member 160 of a rotary switch 161. Rotary member 162 of the switch has contacts 163, 163', 164 and 164' provided thereon, which engage contacts 156 on the stationary member. It will be noted that the center contact 156 on the stationary member 160 is not engaged by a corresponding contact on the rotary member 162, and therefore the contact 154 connected to this center contact 156 is the null point in the tilt-responsive unit 13a.

The three contacts 163 on the left-hand side of the switch 161 are connected by a wire 165 to the high-speed terminal 166 of a two-speed motor 11a. The single contact 164 adjacent the midpoint of the rotary switch member 162 is connected by a wire 170 to the low-speed terminal 171 of motor 11a. The ground terminal 172 of motor 11a is connected by wire 173 to the ground side of the battery 32, while the pendulum contact 153 is connected by a wire 174 to the other side of the battery.

The three contacts 163' on the right-hand side of the switch 161 are connected by a wire 175 to the high-speed terminal 176 of a two-speed motor 12a. The single contact 164' adjacent the midpoint of the rotary switch member 162 is connected by a wire 180 to the low-speed terminal 181 of motor 12a. The ground terminal 182 is also connected by the wire 173 to the ground side of battery 32.

In operation, the pendulum normally hangs straight down from its pivot, and contact 153 on the pendulum engages the center contact 154, which is the null point. Tilting of the movable member 10 causes the pendulum 151 to swing toward one end or the other of the circular arc of contacts. If the member 10 is considerably tilted, so that the contact 153 engages one of the end contacts 154 connected to the high-speed terminal 166 or 176 of motors 11a or 12a, the motor operates at maximum speed to return the member 10 rapidly to its original position. As the pendulum 151 swings back toward its central null point, the contact 153 passes over the contact 154 which is connected to the low-speed terminal 171 or 181 of motors 11a or 12a. This causes the motor to operate at a reduced speed, so that the movable member slows down and comes to rest at the exact preset position, without overshooting the mark.

If the member 10 is tilted only slightly, so that the pendulum contact 153 engages one of the contacts 154 immediately adjacent the null point contact, the amount of correction required is relatively slight, and the motors 11a or 12a are operated at slow speed to bring the member 10 back to its original position. The embodiment of Figure 4 thus operates to bring about the recovery of the member 10 from a tilted position at a speed more or less proportional to the amount of angular deflection; recovery being relatively slow for small angular deflections, and relatively rapid for larger angular deflections.

While I have shown and described in considerable detail what I believe to be the preferred forms of my invention, it will be understood that such details are merely illustrative, and that various changes may be made in the shape and arrangement of the several parts without departing from the scope of the appended claims.

I claim:

1. For use with a movable member having reversible motor means connected therewith to tilt the same in one direction or the other, an automatic leveling control for holding said movable member at a predetermined angle of inclination comprising, in combination, a tilt-responsive unit connected to said member to be moved thereby, said unit having a plurality of spaced, aligned contacts provided thereon and arranged in a row, a contact medium bridging two adjacent contacts on said unit, said contact medium being movable progressively along said contacts toward one end or the other of said row in response to tilting of said unit, means providing a source of electrical energy, said means being connected at one side to one side of said motor means, a manually adjustable switch comprising a pair of relatively movable members, both of said switch members having a plurality of aligned contacts provided thereon which are adapted to register with one another, the contacts of one of said switch members being connected to corresponding contacts on said tilt-responsive unit, the contacts of the other switch member being alternately connected to the other side of said motor means and to the other side of said means providing electrical energy, except that two adjacent intermediate contacts of said other switch member are both connected to one of said means, the contacts on one side of said two adjacent contacts being connected to said motor means to operate the same so that said movable member is tilted in one direction and the contacts on the other side being connected to said motor means to operate the same so that said movable member is tilted in the other direction, said two adjacent contacts being operable to produce a condition of like polarity on two adjacent contacts in said tilt-responsive unit, thereby producing a null point in said unit which can be shifted by moving said other switch member with respect to said one switch member, movement of said contact medium to one side or the other of said adjusted null point causing said motor means to restore said movable member to said predetermined angle of inclination.

2. For use with a movable member having reversible motor means connected therewith to tilt the same in one direction or the other, an automatic leveling control for holding said movable member at a predetermined angle of inclination comprising, in combination, a tilt-responsive unit connected to said member to be moved thereby, said unit having a plurality of spaced, aligned contacts provided thereon and arranged in a row, a contact medium bridging two adjacent contacts on said unit, said contact medium being movable progressively along said contacts toward one end or the other of said row in response to tilting of said unit, means providing a source of electrical energy, said means being connected at one side to one side of said motor means, a manually adjustable switch comprising a stationary member and a rotatable member, both of said members having a plurality of aligned contacts provided thereon, the contacts of said stationary member being arranged in a circular arc and the contacts of said rotatable member being arranged in a concentric arc to register with the contacts of said stationary member, the contacts of one of said switch members being connected to corresponding contacts on said tilt-responsive unit, the contacts of the other switch member being alternately connected to the other side of said motor means and to the other side of said means providing electrical energy, except that two adjacent center contacts of said other switch member are both connected to one of said means, the contacts on one side of said two adjacent center contacts being connected to said motor means to operate the same so that said movable member is tilted in one direction and the contacts on the other side being connected to said motor means to operate the same so that said movable member is tilted in the other direction, said two adjacent center contacts being operable to produce a condition of like polarity on two adjacent contacts in said tilt-responsive unit, thereby producing a null point in said unit which can be shifted by turning said rotatable switch member with respect to said stationary switch member, movement of said contact medium to one side or the other of said adjusted null point causing said motor means to restore said movable member to said predetermined angle of inclination.

3. For use with a movable member having reversible motor means connected therewith to tilt the same in one direction or the other, an automatic leveling control for holding said movable member at a predetermined angle of inclination comprising, in combination, a tilt-responsive unit connected to said member to be moved thereby, said unit having a plurality of spaced, aligned contacts provided thereon and arranged in a row, a contact medium bridging two adjacent contacts on said unit, said contact medium being movable progressively along said contacts toward one end or the other of said row in response to tilting of said unit, means providing a source of electrical energy, said means being connected at one side to one side of said motor means, a manually adjustable switch comprising two parallel rectilinear members, one of said members being stationary and the other member being slidably supported for linear movement parallel to said stationary member, both of said members having a plurality of uniformly spaced aligned contacts provided thereon, the contacts of said movable member being arranged to register with corresponding contacts on said stationary member, the contacts of one of said switch members being connected to corresponding contacts on said tilt-responsive unit, the contacts of the other switch member being alternately connected to the other side of said motor means and to the other side of said means providing electrical energy, except that two adjacent intermediate contacts of said other switch member are both connected to one of said means, the contacts on one side of said two adjacent contacts being connected to said motor means to operate the same so that said movable member is tilted in one direction and the contacts on the other side being connected to said motor means to operate the same so that said movable member is tilted in the other direction, said two adjacent contacts being operable to produce a condition of like polarity on two adjacent contacts in said tilt-responsive unit, thereby producing a null point in said unit which can be shifted in by sliding said movable switch member with respect to said stationary switch member, movement of said contact medium to one side or the other of said adjusted null point causing said motor means to restore said movable member to said predetermined angle of inclination.

4. For use with a movable member having reversible motor means connected therewith to tilt the same in one direction or the other, an automatic leveling control for holding said movable member at a predetermined angle of inclination comprising, in combination, a tilt-responsive unit connected to said member to be tilted thereby, said unit having a plurality of spaced contacts arranged in a row and a contact medium movable successively from one of said contacts to the other in response to tilting of the unit, a manually adjustable switch comprising a pair of relatively movable members, both of said switch members having a plurality of aligned contacts provided thereon which are adapted to register with one another, the contacts of one of said switch members being connected to corresponding contacts in said tilt-responsive unit, the contacts of the other switch mmeber on one side of center being connected to said motor means to operate the same so that said movable member is tilted in one direction and the contacts on the other side of center being connected to said motor means to operate the same so that said movable member is tilted in the other direction, and a source of electrical energy connected to said motor means, and means completing the circuit from said energy source to said switch through said tilt-responsive unit, said switch being operable to make any selected contact on said tilt-responsive unit the null point whereby engagement of said selected contact by said contact medium produces an open circuit, movement of said contact medium to one side or the other of said selected contact causing said motor means to restore said movable member to said predetermined angle of inclination.

5. For use with a movable member having reversible motor means connected therewith to tilt the same in one direction or the other, an automatic leveling control for holding said movable member at a predetermined angle of inclination comprising, in combination, a tilt-responsive unit connected to said member to be tilted thereby, said unit having a plurality of longitudinally spaced pairs of contacts arranged in a row, one of the contacts in each of said pairs being connected to said motor means, a manually adjustable switch comprising two relatively movable members, one of said switch members having a plurality of contacts connected to the other of the contacts in each of said pairs of contacts on said tilt-responsive unit, the other of said switch members having means on one side of center engaging certain of the contacts on said one switch member, and other means on the other side of center engaging other contacts on said one switch member, said first-named means being connected to said motor means to operate the same so that said movable member is tilted in one direction, said other means being connected to said motor means to operate the same so that said movable member is tilted in the other direction, said switch being operable to open the circuit to any selected pair of contacts on said tilt-responsive unit, whereby said selected pair of contacts becomes the null point of the system, and means providing a source of electrical energy connected to said motor means to operate the same when the circuit thereof is closed, movement of said contact medium to one side or the other of said selected pair of contacts causing said motor means to restore said movable member to said predetermined angle of inclination.

6. For use with a movable member having reversible motor means connected therewith to tilt the same in one direction or the other, an automatic leveling control for holding said movable member at a predetermined angle of inclination comprising, in combination, a tilt-responsive unit connected to said member to be tilted thereby, said unit having a plurality of spaced contacts arranged in a row and a contact medium movable successively from one of said contacts to the other in response to tilting of the unit, a manually adjustable switch comprising a pair of relatively movable members, both of said switch members having a plurality of aligned contacts provided thereon which are adapted to register with one another, the contacts of one of said switch members being connected to corresponding contacts in said tilt-responsive unit, the contacts of the other switch member on one side of center being connected to said motor means to operate the same so that said movable member is tilted in one direction and the contacts on the other side of center being connected to said motor means to operate the same so that said movable member is tilted in the other direction, a source of electrical energy connected to said switch and to said motor means through said tilt-responsive unit, said switch being operable to make any selected contact on said tilt responsive unit the null point whereby engagement of said selected contact by said contact medium produces an open circuit, movement of said contact medium to one side or the other of said selected contact causing said motor means to move said movable member in one direction or the other, and means connected to said switch contacts for operating said motor means at high speed when said movable member has been deflected to a considerable angle from a predetermined angle of inclination, and for operating said motor means at a reduced speed as said movable member approaches said predetermined angle of inclination.

7. For use with a movable member having reversible motor means connected therewith to tilt the same in one direction or the other, an automatic leveling control for holding said movable member at a predetermined angle of inclination comprising, in combination, a tilt-responsive unit connected to said member to be tilted thereby, said unit having a plurality of spaced contacts arranged in a row and a contact medium movable successively from one of said contacts to the other in response to tilting of the unit, a manually adjustable switch comprising a pair of relatively movable members, both of said switch members having a plurality of aligned contacts provided thereon which are adapted to register with one another, the contacts of one of said switch members being connected to corresponding contacts in said tilt-responsive unit, the contacts of the other switch member on one side of center being connected to said motor means to operate the same so that said movable member is tilted in one direction and the contacts on the other side of center being connected to said motor means to operate the same so that said movable member is tilted in the other direction, a source of electrical energy connected to said switch and to said motor means through said tilt-responsive unit, said switch being operable to make any selected contact on said tilt responsive unit the null point whereby engagement of said selected contact by said contact medium produces an open circuit, movement of said contact medium to one side or the other of said selected contact causing said motor means to move said movable member in one direction or the other, a plurality of graduated resistances connected into the contacts of said other switch member on either side of center, whereby a greater amount of current is transmitted to said motor means when said member is deflected to a considerable angle from said predetermined angle of inclination, and a lesser amount of current is transmitted to said motor means as said member approaches said predetermined angle of inclination, thereby providing for a diminishing speed of recovery as said member is returned to its original position.

8. For use with a movable member having two speed, reversible motor means connected therewith to tilt the same in one direction or the other, an automatic leveling control for holding said movable member at a predetermined angle of inclination comprising, in combination, a tilt-responsive unit connected to said member to be tilted thereby, said unit having a plurality of spaced contacts arranged in a row and a contact medium movable successively from one of said contacts to the other in response to tilting of the unit, a manually adjustable switch comprising a pair of relatively movable members, both of said switch members having a plurality of aligned contacts provided thereon which are adapted to register with one another, the contacts of one of said switch members being connected to corresponding contacts in said tilt-responsive unit, the contacts of the other switch member on one side of center being connected to said motor means to operate the same so that said movable member is tilted in one direction and the contacts on the other side of center being connected to said motor means to operate the same so that said movable member is tilted in the other direction, and a source of electrical energy connected to said motor means, and means completing the circuit from said energy source to said switch through said tilt-responsive unit, said switch being operable to make any selected contact on said tilt-responsive unit the null point whereby engagement of said selected contact by said contact medium produces an open circuit, the contacts on said tilt-responsive unit immediately adjacent said selected contact being connected to the low speed terminals of said motor means, and certain, at least, of the contacts beyond each side of said adjacent contacts being connected to the high speed terminals of said motor means, movement of said contact medium to one side or the other of said selected contact causing said motor means to restore said movable member to said predetermined angle of inclination.

9. For use with a movable member having reversible motor means connected therewith to tilt the same in one direction or the other, an automatic leveling control for holding said movable member at a predetermined angle of inclination comprising, in combination, a tilt-responsive unit connected to said member to be tilted thereby, said unit having a plurality of spaced contacts arranged in a row and a contact medium movable successively from one of said contacts to the other in response to tilting of the unit, a manually adjustable switch comprising a pair of relatively movable members, both of said switch members having a plurality of aligned contacts provided thereon which are adapted to register with one another, the contacts of one of said switch members being connected to corresponding contacts in said tilt-responsive unit, the contacts of the other switch member on one side of center being connected to said motor means to operate the same so that said movable member is tilted in one direction and the contacts on the other side of center being connected to said motor means to operate the same so that said movable member is tilted in the other direction, a source of electrical energy connected to said switch and to said motor means through said tilt-responsive unit, said switch being operable to make any selected contact on said tilt responsive unit the null point whereby engagement of said selected contact by said contact medium produces an open circuit, movement of said contact medium to one side or the other of said selected contact causing said motor means to move said movable member in one direction or the other, means connected to said switch contacts for operating said motor means at high speed when said movable member has been deflected to a considerable angle from a predetermined angle of inclination, and for operating said motor means at a reduced speed as said movable member approaches said predetermined angle of inclination, and a meter graduated in terms of angular deflection of said movable member from said predetermined angle of inclination, said meter being connected into the motor circuit and responsive to variations in the amount of current transmitted to the motor means through said circuit.

10. In combination with a control system for a tiltable member, which system comprises reversible power means for driving the member in its tilting movement, a contact carrier connected to the member to be moved thereby, a plurality of control contacts fixedly mounted on the contact carrier in longitudinally spaced mutual relation, control wiper means engageable with the control contacts and movable longitudinally thereof in response to tilting of the member, and circuit means for actuating the power means in response to departure of the wiper means from a predetermined null position with respect to the control contacts; switching means actuable manually to shift said null position longitudinally of the control contacts and comprising first and second switch members mounted for manual movement between a plurality of discrete mutual positions, a plurality of switch contacts mounted in mutually spaced relation with respect to one switch member, means electrically connecting the respective switch contacts with corresponding control contacts, a plurality of switch contacting means mounted with respect to the other switch member in position to engage respective switch contact formations in each mutual position of the switch members, the switch contacting means comprising two sets which are positioned on opposite sides of a switch null position, first electrical circuit means energizable to actuate the power means in one direction and including in series the control wiper means and one of the sets of switch contacting means, and second electrical circuit means energizable to actuate the power means in the other direction and including in series the control wiper means and the other set of switch contacting means.

11. The combination defined in claim 10 and in which the switch contacting means of each set and the switch contacts are distributed longitudinally of the switch movement at uniform and corresponding intervals.

12. The combination defined in claim 11 and in which the interval between the two switch contacting means that are oppositely adjacent the switch null position is twice the said uniform interval between the switch contacting means for each set.

13. The combination defined in claim 10 and in which said power means is actuable selectively at normal speed and at reduced speed, and in which each of the first and second electrical circuit means includes circuit means connected in series with the switch contacting means adjacent the switch zero position for actuating the power means at reduced speed and circuit means connected in series with at least one switch contacting means that is non-adjacent the switch zero position for actuating the power means at normal speed.

14. The combination defined in claim 10 and in which each of the first and second electrical circuit means includes impedance means connected between its said terminal and the switch contacting means adjacent the switch zero.

15. The combination defined in claim 10 and including also a second plurality of switch contacting means which are interposed between the first mentioned switch contacting means of each set and which are connected in parallel to a common terminal, all of said switch contacting means forming a single uniformly spaced series, the switch contacts being mutually spaced uniformly with a corresponding spacing, said control wiper means being adapted to bridgingly engage two adjacent control contacts, and both said first and second electrical circuit means including said common terminal.

References Cited in the file of this patent

UNITED STATES PATENTS

| | | |
|---|---|---|
| 999,012 | Danziger | July 25, 1911 |
| 1,565,763 | Vickers | Dec. 15, 1925 |
| 1,626,567 | Steinbrecht | Apr. 26, 1927 |
| 1,997,412 | Fischel | Apr. 9, 1935 |
| 2,490,628 | Isserstedt | Dec. 6, 1949 |
| 2,636,290 | Bell | Apr. 28, 1953 |
| 2,806,143 | Koppel | Sept. 10, 1957 |

FOREIGN PATENTS

| | | |
|---|---|---|
| 10,299 | Great Britain | of 1909 |